(12) United States Patent
Thiele et al.

(10) Patent No.: US 8,317,343 B2
(45) Date of Patent: *Nov. 27, 2012

(54) INTERIOR OR EXTERIOR REARVIEW MIRROR ASSEMBLY

(75) Inventors: Steven Thiele, Marysville, OH (US); Brent Gaertner, Columbus, OH (US)

(73) Assignee: Honda Motor Co., Ltd., Tokyo (JP)

(*) Notice: Subject to any disclaimer, the term of this patent is extended or adjusted under 35 U.S.C. 154(b) by 551 days.

This patent is subject to a terminal disclaimer.

(21) Appl. No.: 11/966,038

(22) Filed: Dec. 28, 2007

(65) Prior Publication Data

US 2009/0115081 A1    May 7, 2009

Related U.S. Application Data

(60) Provisional application No. 60/878,314, filed on Dec. 31, 2006.

(51) Int. Cl.
*G02B 5/08* (2006.01)
*G02B 7/182* (2006.01)
*B29C 47/00* (2006.01)

(52) U.S. Cl. .................... 359/844; 359/883; 156/245

(58) Field of Classification Search .................. None
See application file for complete search history.

(56) References Cited

U.S. PATENT DOCUMENTS

| | | | |
|---|---|---|---|
| 3,978,190 A | 8/1976 | Kurz, Jr. et al. | |
| 4,281,898 A | 8/1981 | Ochiai et al. | |
| 4,435,042 A | 3/1984 | Wood et al. | |
| 4,436,371 A | 3/1984 | Wood et al. | |
| 4,564,234 A | 1/1986 | Kaiser et al. | |
| 4,826,289 A | 5/1989 | Vandenbrink et al. | |
| 5,066,112 A | 11/1991 | Lynam et al. | |
| 5,115,346 A * | 5/1992 | Lynam | 359/604 |
| 5,150,258 A | 9/1992 | Schmidt et al. | |
| 5,178,448 A | 1/1993 | Adams et al. | |
| 5,245,479 A | 9/1993 | Falanga | |
| 5,327,288 A | 7/1994 | Wellington et al. | |
| 5,448,397 A | 9/1995 | Tonar | |
| 5,521,760 A | 5/1996 | De Young et al. | |
| 5,659,423 A * | 8/1997 | Schierbeek et al. | 359/604 |
| 5,669,698 A | 9/1997 | Veldman et al. | |
| 5,682,267 A | 10/1997 | Tonar et al. | |
| 5,808,777 A | 9/1998 | Lynam et al. | |
| 5,907,430 A | 5/1999 | Taylor et al. | |

(Continued)

OTHER PUBLICATIONS

"encompass," The Free Merriam-Webster Dictionary, http://www.merriam-webster.com/dictionary/encompass, Apr. 4, 2011.*

(Continued)

*Primary Examiner* — Jade R Chwasz
(74) *Attorney, Agent, or Firm* — Mark Duell; Emerson Thomson Bennett

(57) ABSTRACT

A mirror assembly may include a middle portion having a first side, a second side, and a perimeter, where the first side comprises a reflective portion. A front portion may be substantially transparent and may be formed by injecting a first thermoplastic material into a mold on the first side of the middle portion. A back portion may be substantially opaque and may be formed by injecting a second thermoplastic material into the mold on the second side of the middle portion. The front portion and the back portion together may substantially encompass the perimeter of the middle portion.

20 Claims, 13 Drawing Sheets

U.S. PATENT DOCUMENTS

| | | |
|---|---|---|
| 6,102,546 A | 8/2000 | Carter |
| 6,124,886 A | 9/2000 | DeLine et al. |
| 6,449,082 B1 | 9/2002 | Agrawal et al. |
| 6,612,708 B2 * | 9/2003 | Chu ................... 359/883 |
| 6,773,124 B2 | 8/2004 | Marusawa et al. |
| 6,834,969 B2 * | 12/2004 | Bade et al. ................... 359/507 |
| 6,877,867 B1 | 4/2005 | Murakami |
| 6,934,067 B2 | 8/2005 | Ash et al. |
| 6,954,300 B2 | 10/2005 | Varaprasad et al. |
| 6,963,439 B2 | 11/2005 | Tonar |
| 7,004,592 B2 | 2/2006 | Varaprasad et al. |
| 7,009,751 B2 | 3/2006 | Tonar et al. |
| 7,025,469 B1 | 4/2006 | Manfre' et al. |
| 7,083,312 B2 | 8/2006 | Pastrick et al. |
| 7,086,683 B2 * | 8/2006 | Radu et al. ................... 296/97.5 |
| 7,108,409 B2 | 9/2006 | DeLine et al. |
| 2004/0264011 A1 | 12/2004 | Lynam |
| 2005/0134983 A1 | 6/2005 | Lynam |
| 2006/0007550 A1 | 1/2006 | Tonar et al. |
| 2006/0050356 A1 | 3/2006 | Varaprasad et al. |

OTHER PUBLICATIONS

Fosta-Tek Optics, Optical Molding Services, Dec. 18, 2006, http://www.fosta-tek.com/molding.html, pp. 1-2.

Injection Molded Plastics: Automotive Information, Dec. 18, 2006, http://www.thomasnet.com/heading.html?cov=EM&what=Injection=Molded=Plastics%3 . . . , pp. 1-2.

U.S. Utility Patent Appln. for Mirror Assembly, filed Dec. 28, 2007, U.S. Appl. No. 11/965,909.

* cited by examiner

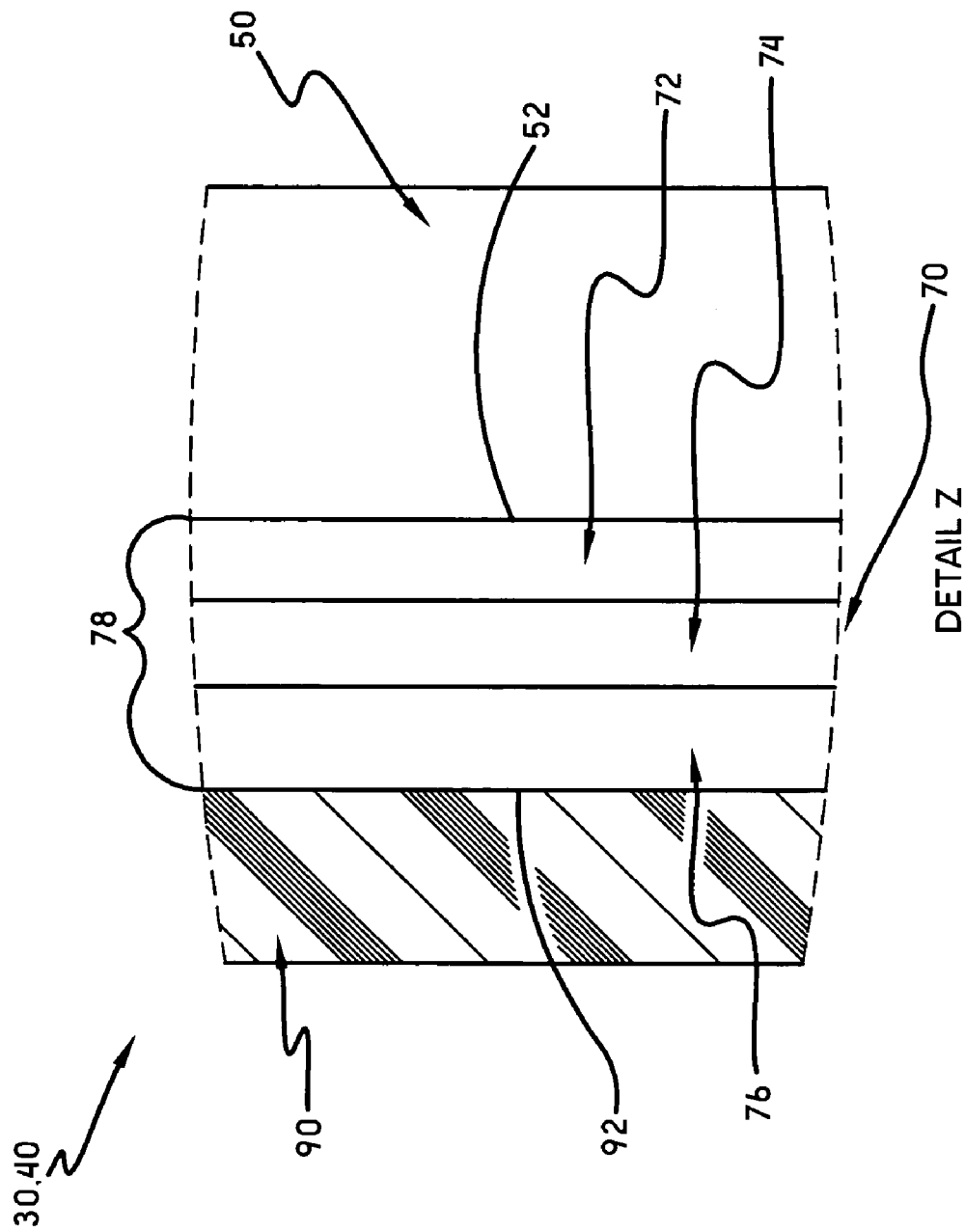

INTERIOR OR EXTERIOR REARVIEW MIRROR ASSEMBLY

This application claims priority to U.S. Ser. No. 60/878,314 titled EXTERIOR PRISMATIC DOOR MIRROR, filed Dec. 31, 2006, which is incorporated herein by reference.

I. BACKGROUND OF THE INVENTION

A. Field of Invention

This invention pertains to the art of methods and apparatuses regarding mirror assemblies, and more specifically to methods and apparatuses regarding a mirror assembly for a vehicle.

B. Description of the Related Art

It is known in the art of automotive mirror assemblies to provide a first mirror piece consisting of a sheet of glass having a metallic coating and a second mirror piece consisting of a plastic back piece. The second mirror piece serves as a housing. The first mirror piece is then attached to the second mirror piece, typically with an adhesive pad. The mirror assembly, consisting of both the first and second mirror pieces, is then attached to the interior or exterior of a vehicle.

While such known mirror assemblies work well for their intended purpose, improvements are greatly desirable. One desirable improvement would be to make a mirror assembly more light weight. Another would be to improve the manufacturability by eliminating the assembly step required to attach the first mirror piece to the second mirror piece. Still another desirable improvement would be to improve the tolerance of curvature. Yet another desirable improvement would be to increase the styling freedom in choosing a mirror shape and/or curvature.

The present invention is simple in design and provides the improvements noted above. The limitations and difficulties inherent in the art are therefore overcome in a way that is simple and efficient, while providing better and more advantageous results.

II. SUMMARY OF THE INVENTION

According to one embodiment of the invention, a vehicle comprises a vehicle frame, an engine supported to the vehicle frame, at least one ground engaging wheel supported to the frame and operatively connected to the engine to provide locomotion to the vehicle, a vehicle body supported to the frame and defining a passenger compartment, and a mirror assembly supported to the vehicle.

According to another embodiment of the invention, a mirror assembly comprises a middle portion having a first side, a second side, and a perimeter, wherein the first side comprises a reflective portion. A front portion is substantially transparent and is formed by injecting a first thermoplastic material into a mold on the first side of the middle portion. A back portion is substantially opaque and is formed by injecting a second thermoplastic material into the mold on the second side of the middle portion. The front portion and the back portion together substantially encompass the perimeter of the middle portion.

According to another embodiment of the invention, the mirror assembly further comprises a scratch resistant material covering at least a portion of the front portion.

According to another embodiment of the invention, the middle portion of the mirror assembly further comprises a heater member on the second side of the middle portion.

According to still another embodiment of the invention, the first thermoplastic material is a first polycarbonate material and the second thermoplastic material is a second polycarbonate material.

According to another embodiment of the invention, the is back portion is formed within the mold to have a first attachment portion for use in attaching the device to a vehicle.

According to yet another embodiment of the invention, a method of forming a mirror assembly comprises the steps of (a) inserting a middle portion into a mold, wherein the middle portion comprises a first side having a reflective portion, a second side, and a perimeter, (b) inserting a first thermoplastic material into the mold to form a front portion on the first side of the middle portion, wherein the front portion is substantially transparent when the mirror assembly is used, and (c) inserting a second thermoplastic material into the mold on the second side of the middle portion to form a back portion, wherein the back portion is substantially opaque when the mirror assembly is used, and wherein the front portion and the back portion together substantially encompass the perimeter of the middle portion.

One advantage of this invention is that mirror assemblies can be made smaller as there is no longer a need for a holding edge.

Another advantage of this invention is that mirror assemblies can be made with reduced weight.

Another advantage of this invention is that the process for making mirror assemblies can be simplified.

Yet another advantage of this invention is that designers of mirror assemblies can have additional styling freedom for varying mirror shapes and curvatures.

Still another advantage of this invention is that the assembly step required to attach the first mirror piece to the second mirror piece can be eliminated.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 7 is a sectional view of the mirror assembly taken from Detail Z in FIG. 6.

IV. DETAILED DESCRIPTION OF THE INVENTION

Figure 1:
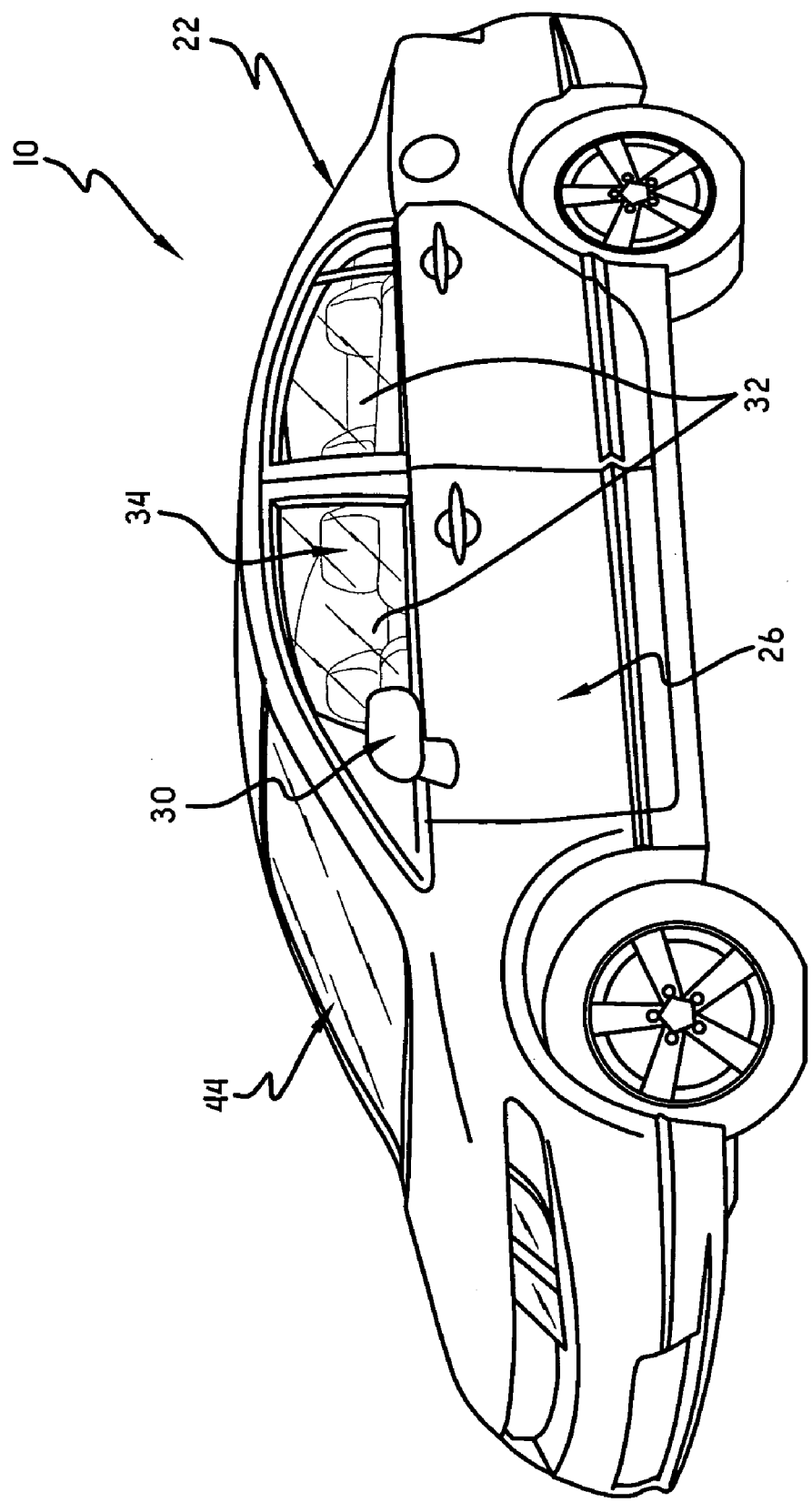
FIG. 1 is a side perspective view of a vehicle equipped with an exterior mirror assembly according to one embodiment of this invention.
Figure 2:
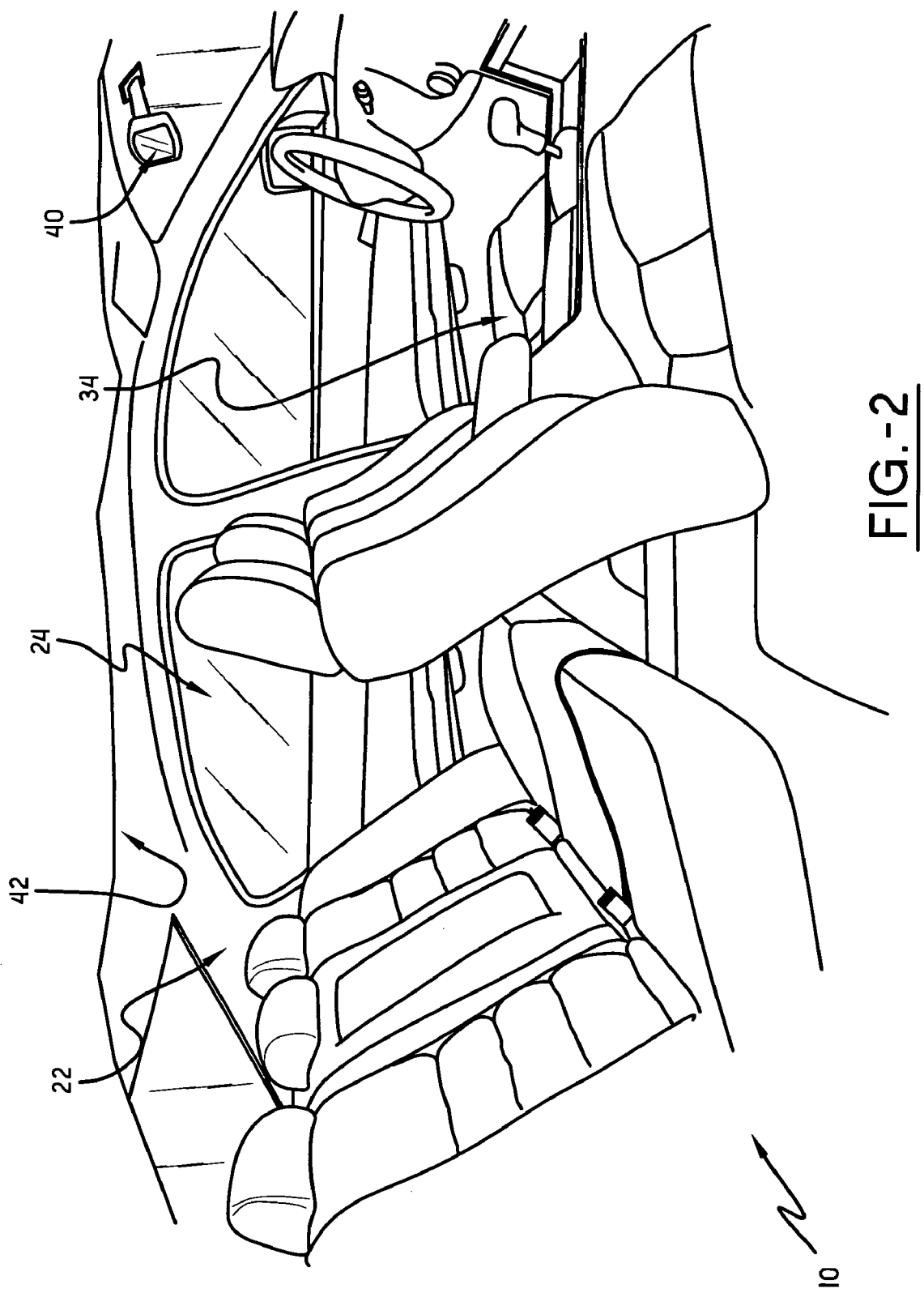
FIG. 2 is a side perspective view of a vehicle interior showing an interior mirror assembly according to another embodiment of this invention.
Figure 8:
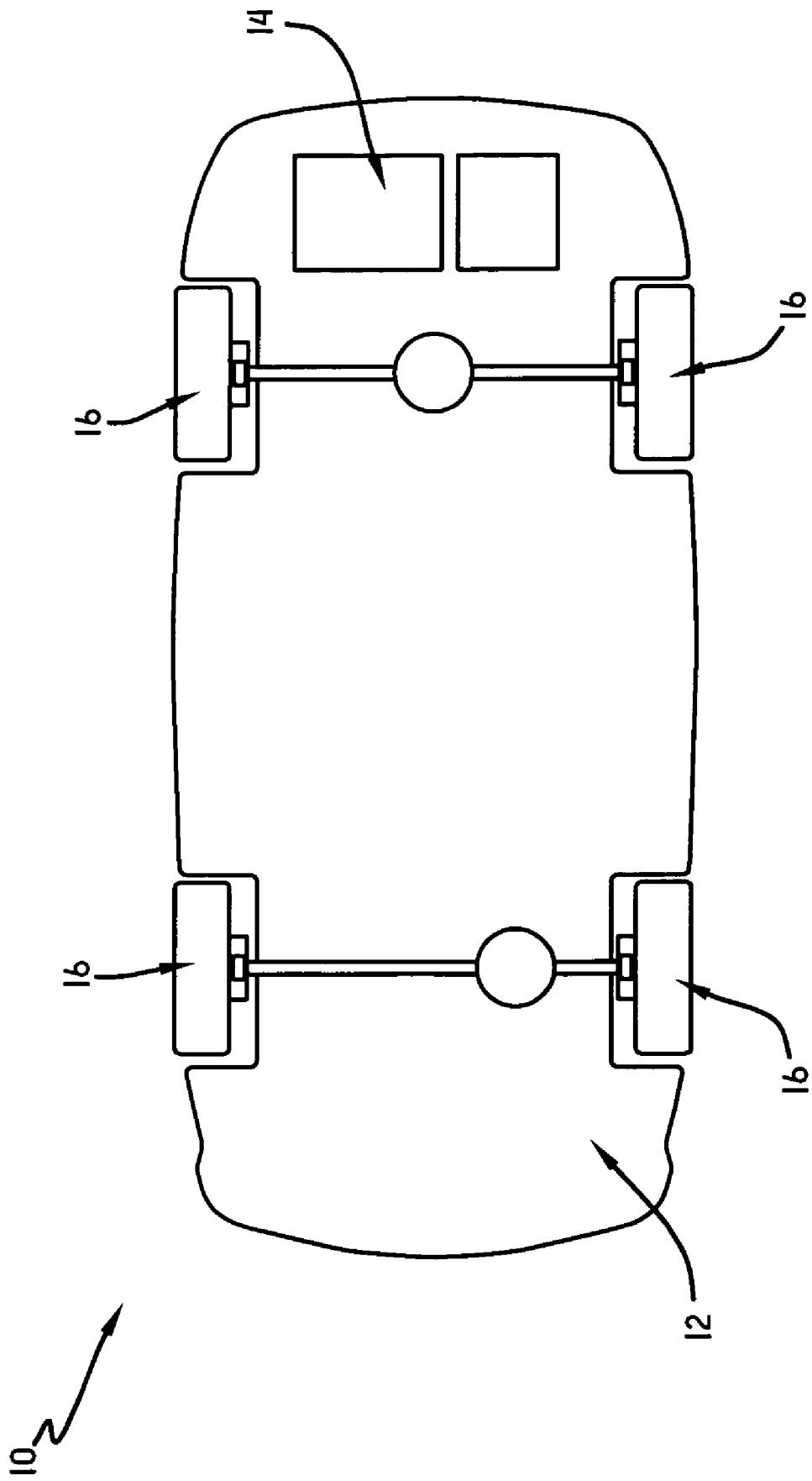
FIG. 8 is a schematic view of vehicle.

Referring now to the drawings wherein the showings are for purposes of illustrating embodiments of the invention only and not for purposes of limiting the same, FIG. 1 shows a vehicle 10 equipped with an exterior mirror assembly 30 according to one embodiment of this invention and FIG. 2 shows a vehicle 10 equipped with an interior mirror assembly 40 according to another embodiment of this invention. It should be noted that one or more exterior mirror assemblies 30 and one or more interior mirror assemblies 40 can be attached to the same vehicle. As shown in FIG. 8, each vehicle 10, as is well known in the art, may include a frame 12, a drive train including an engine 14 mounted to the frame 12, and one or more ground engaging wheels 16 which are operatively attached to the frame 12 and are used to provide locomotion for the vehicle 10. As shown in FIGS. 1-2, each vehicle 10 may also include a body 22 defining a passenger compartment 24. One or more doors 26, 28 may provide entry into the passenger compartment 24 in any manner known in the art. It should be understood that while the vehicles shown are passenger cars, this invention will work well with any vehicle including, but not limited to, cars, trucks, sport utility vehicles, cross-over vehicles, motorcycles, off-road vehicles, all-terrain vehicles, and airplanes as well as other passenger carrying devices such as boats. This invention may also work well in non-vehicle applications.

Figure 3:
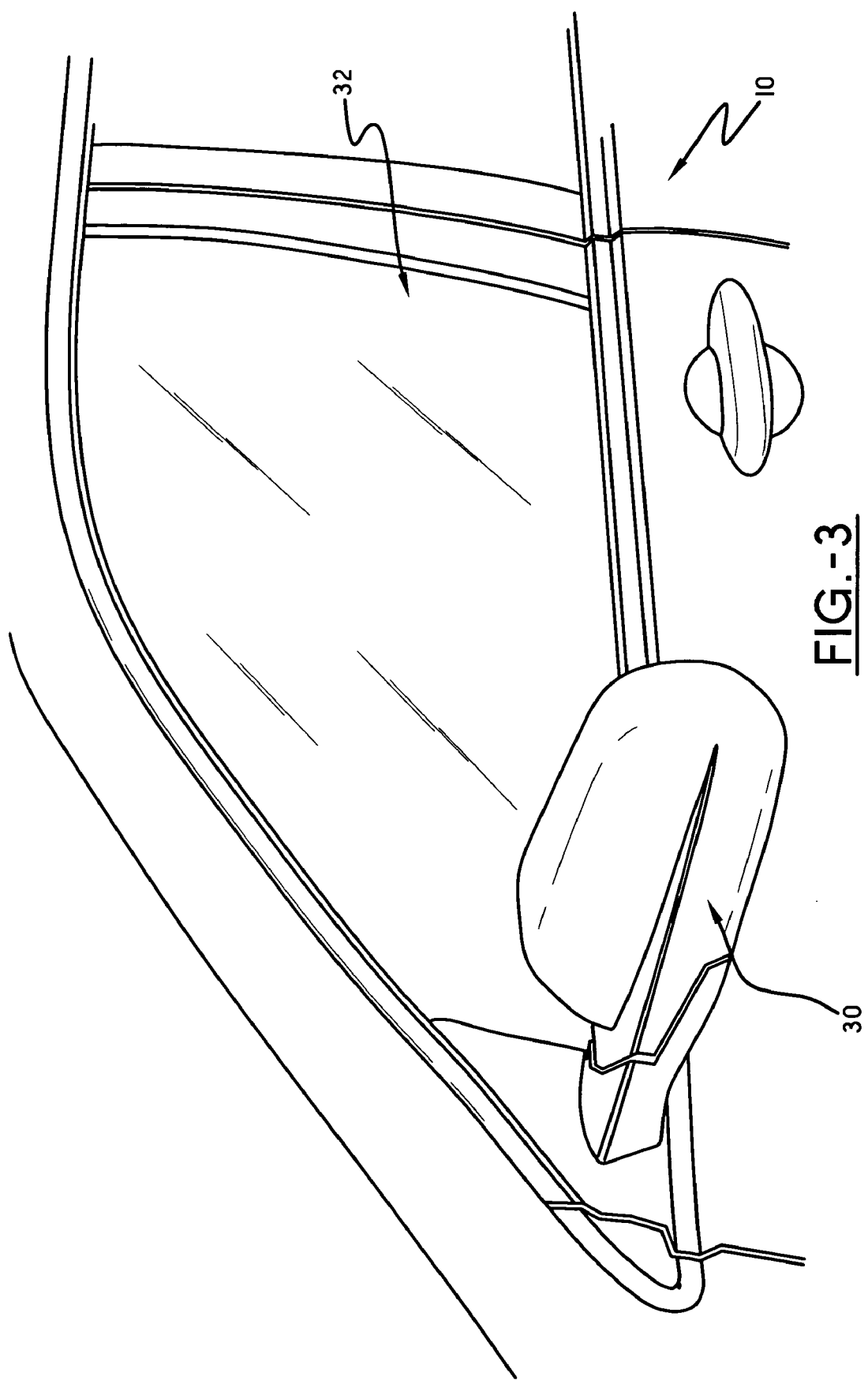
FIG. 3 is a side perspective view of a vehicle exterior showing an exterior mirror assembly according to another embodiment of this invention.
Figure 9:
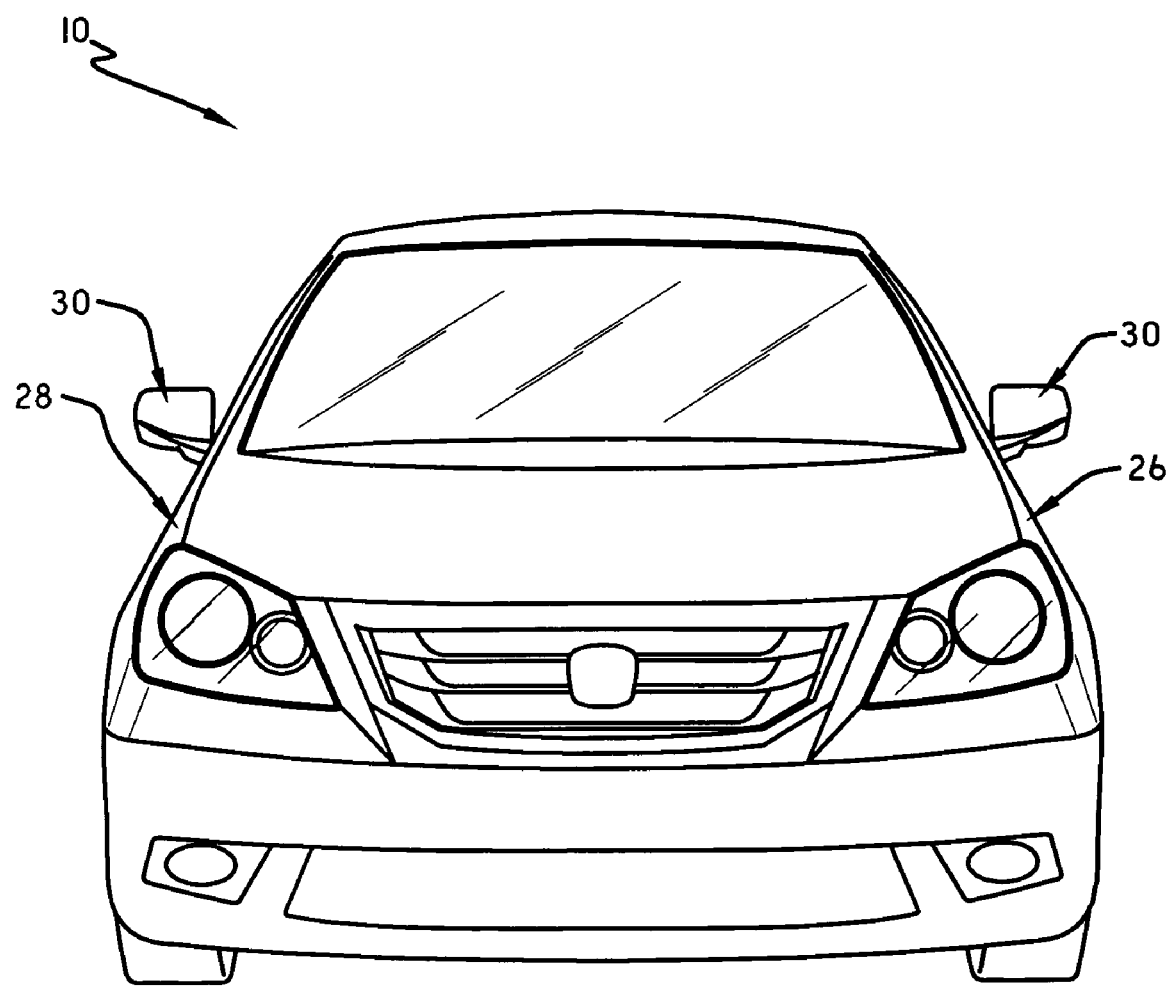
FIG. 9 is a front perspective view of a vehicle exterior showing a pair of exterior mirrors according to one embodiment of this invention.
Figure 10:
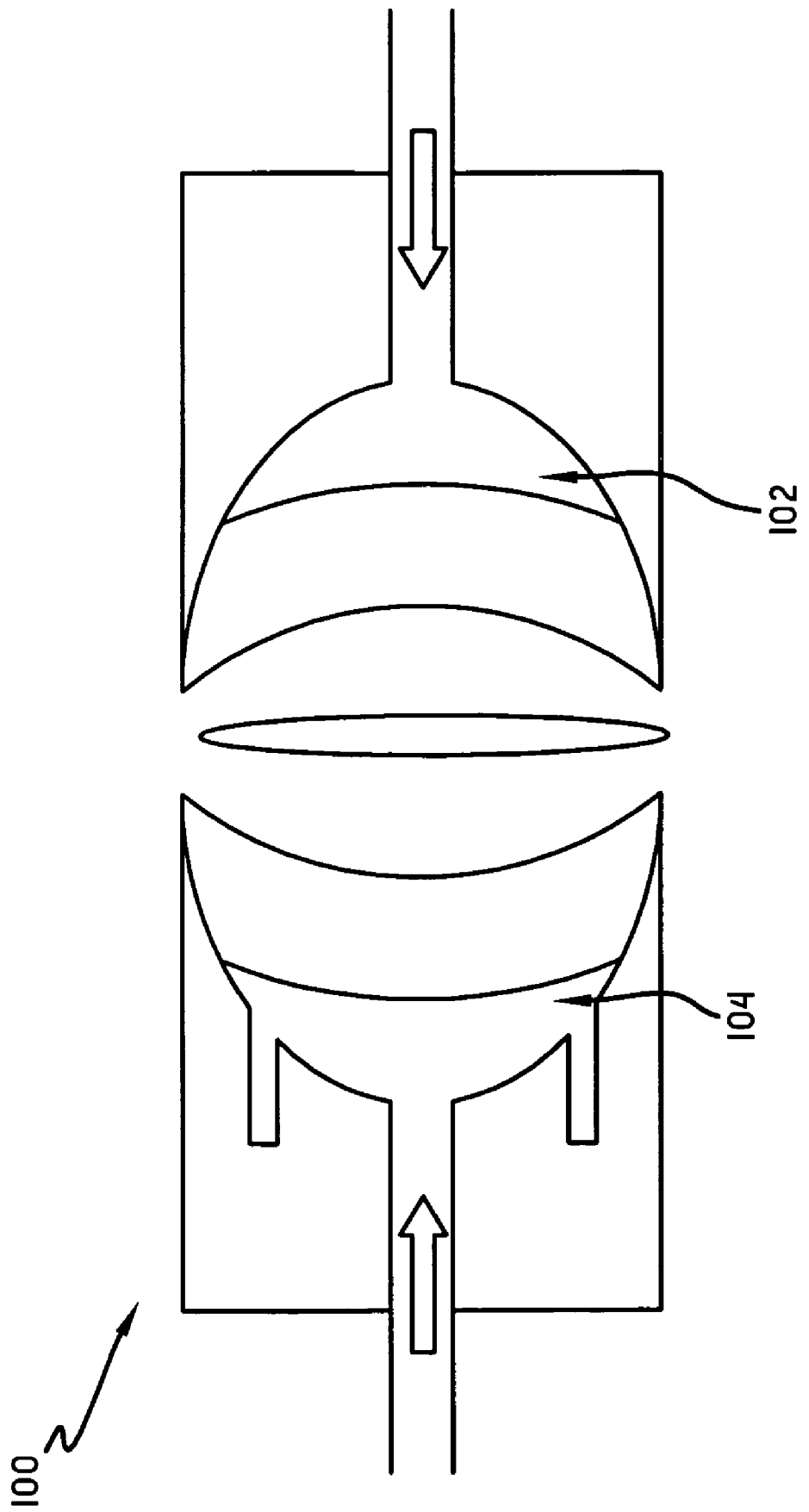
FIG. 10 is a schematic view of a mold that may be used according to one embodiment of this invention.

As shown in FIG. 3, the exterior mirror assembly 30 may extend from an outer surface of the vehicle 10 body 22 such as, in one embodiment, from either of the driver side door 26 or the passenger side door 28. In another embodiment, as shown in FIG. 9, a separate exterior mirror assembly 30 may extend from each door 26, 28. The exterior mirror assembly 30 may be positioned near any one of the passenger compartment windows (or windshields) 32 so that the operator can easily view the exterior mirror assembly 30 from the driver's seat 34 in order to better view objects exterior to the vehicle 10.

Figure 4:
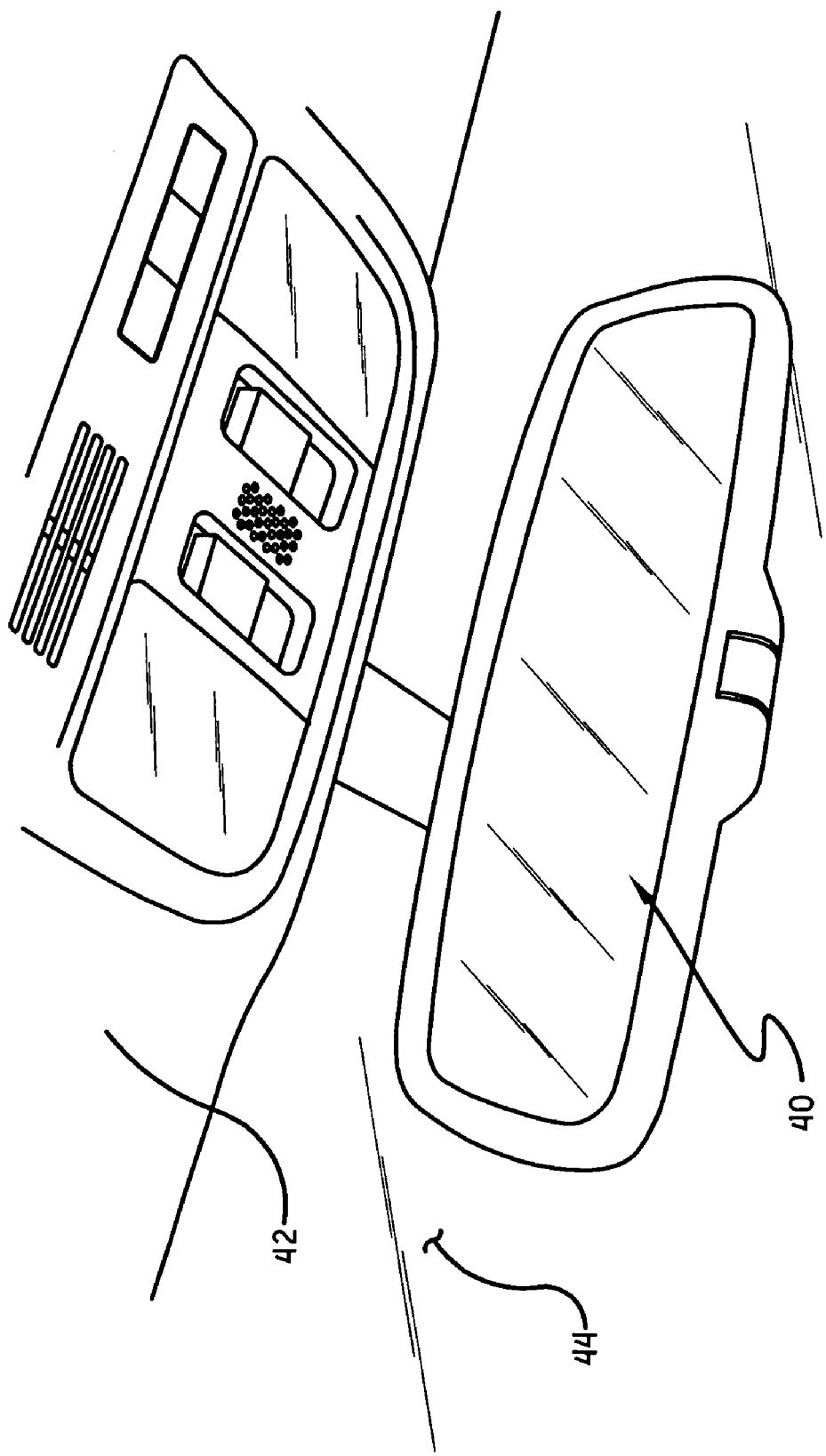
FIG. 4 is a perspective view of a vehicle interior showing an interior mirror assembly according to another embodiment of this invention.

As shown in FIG. 4, the interior mirror assembly 40 may extend from an inner surface of the vehicle 10 body 22 such as, in one embodiment, from a ceiling 42 of the passenger compartment 24, or in another embodiment, from a front windshield 44 of the passenger compartment 24. The interior mirror assembly 40 may be positioned so that the operator can easily view the interior mirror assembly 40 from the driver's seat 34 in order to better view objects within or exterior to the vehicle 10.

Figure 5:
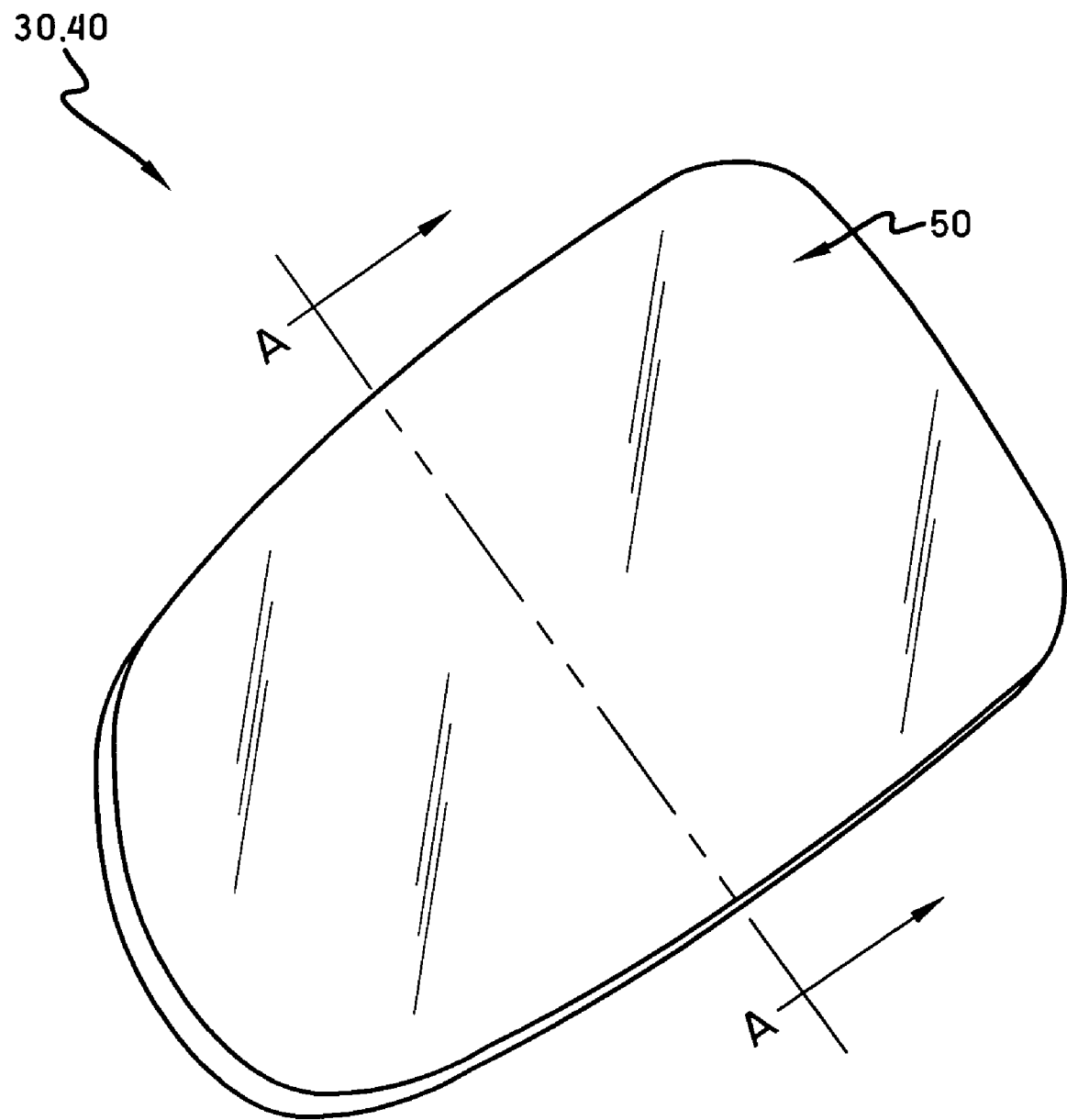
FIG. 5 is a front view of a mirror assembly made according to one embodiment of this invention.
Figure 6:
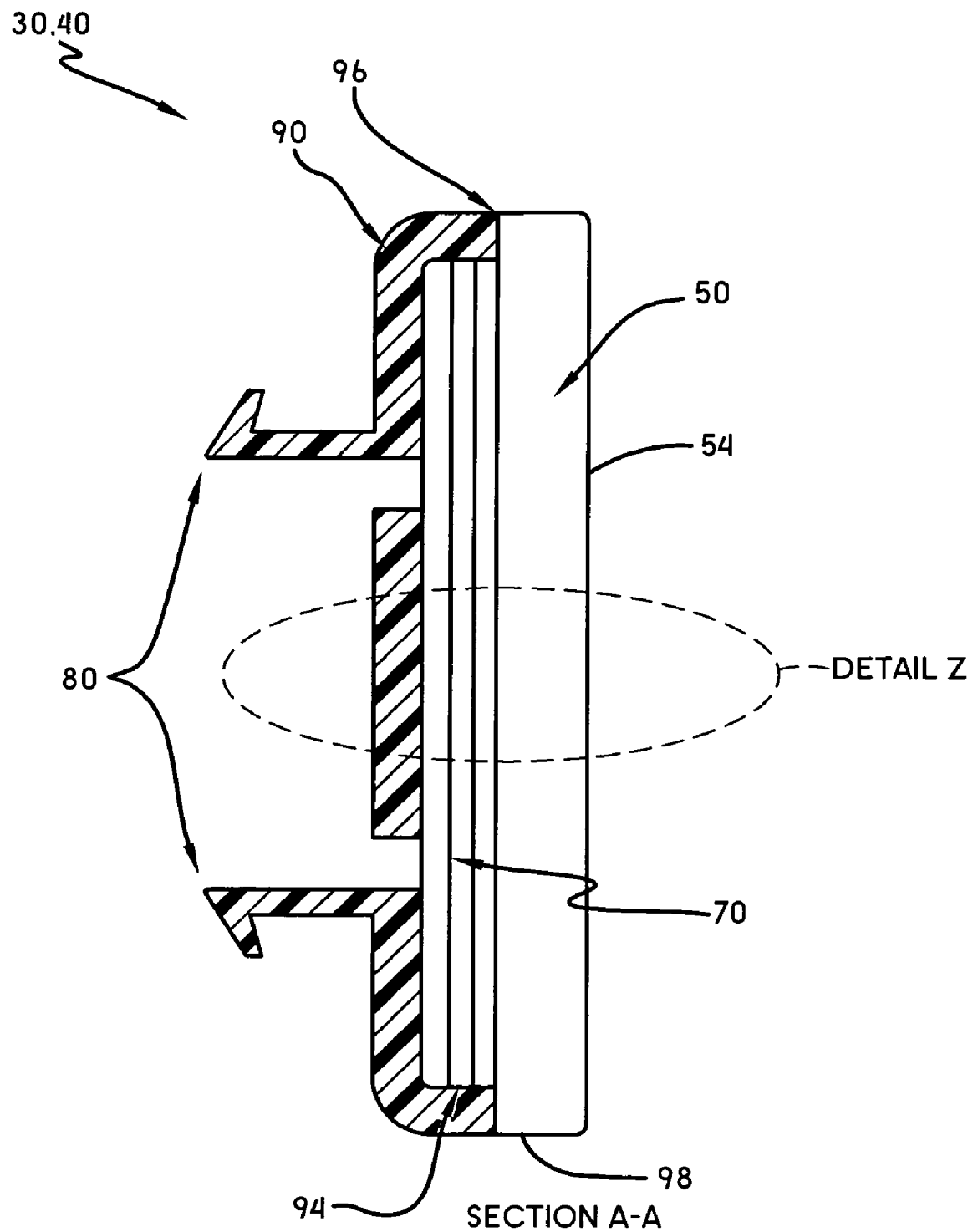
FIG. 6 is a sectional view of the mirror assembly taken along line A-A in FIG. 5.
Figure 6A:
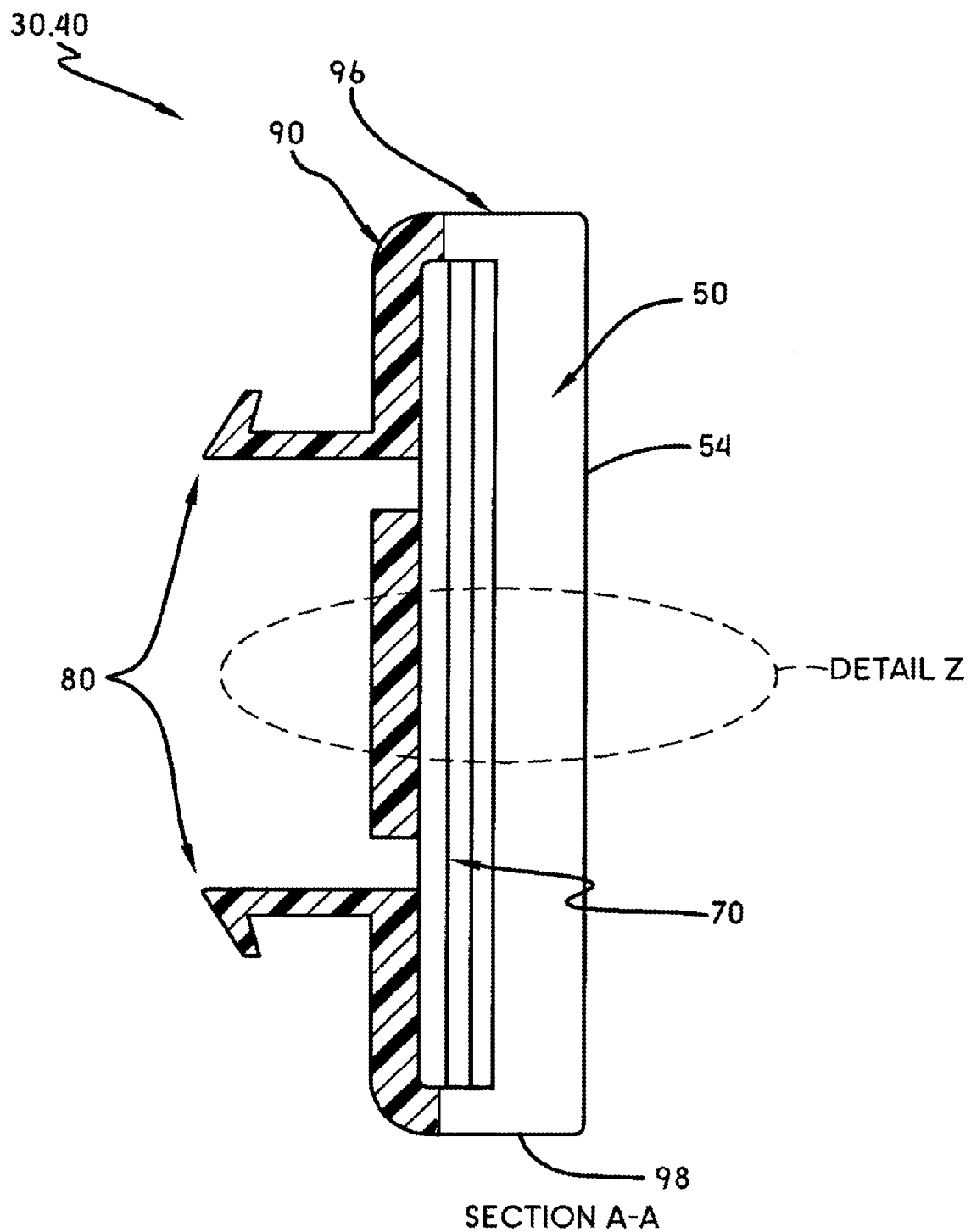
FIG. 6A is a sectional view of the mirror assembly taken along line A-A in FIG. 5.

With reference now to FIGS. 5-7, each mirror assembly, whether exterior mirror assembly 30 or interior mirror assembly 40, may include a front portion 50, a middle portion 70, and a back portion 90. The front portion 50 may be formed of a substantially clear thermoplastic material. In one embodiment, the front portion 50 is formed from a substantially clear polycarbonate material, as will be discussed further below. The back portion 90 may formed of a substantially opaque thermoplastic material. In one embodiment, the back portion 90 is formed from a substantially opaque polycarbonate material. In another embodiment, the back portion 90 includes one or more integrated attachment features 80 for use in attaching the mirror assemblies 30, 40 to the vehicle 10.

With reference now to FIGS. 6-7, the middle portion 70 may include a reflective member 72 for use in reflecting light in a known manner. In a more specific embodiment, the reflective member 72 is generally planar in shape. In yet a more specific embodiment, the reflective member 72 is formed of a metallic film. In another embodiment, the middle portion 70 may include a heater member 76 for use in heating the mirror assemblies 30, 40. When used with an exterior mirror assembly 30, the heater member 76 may be used to melt ice and snow from the front portion 50. In one embodiment, the heater member 76 is formed of a heater film. In another embodiment, the middle portion 70 may include a protective member 74 for use in protecting the reflective member 72 from substantially direct contact with a heater member 76. In one specific embodiment, the protective member 74 is formed of an insulated film. In another embodiment, the protective member 74 is formed of any insulating material chosen within sound engineering judgment. It should be understood that in one embodiment the middle portion 70 includes only the reflective member 72. In another embodiment, the middle portion 70 may also include either the protective member 74 or the heater member 76. In yet another embodiment, the middle portion 70 includes the reflective member 72, the protective member 74, and the heater member 76. In a more specific embodiment using these three members, the middle portion 70 may include a three layer laminated film 78. It should also be understood that in other embodiments the middle portion 70 may include other members.

Figure 11:
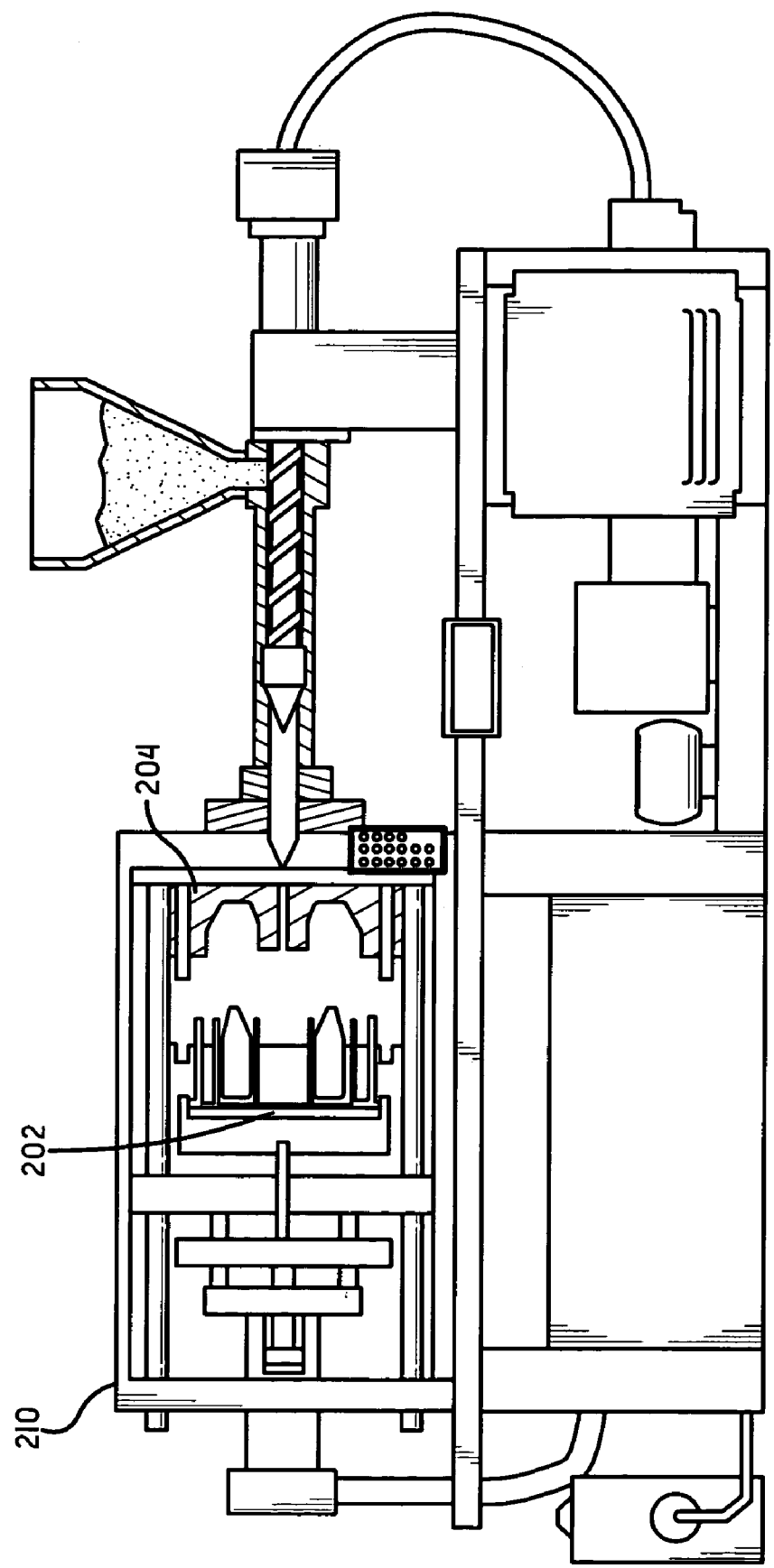
FIG. 11 is a perspective view of an injection molding apparatus.
Figure 12:
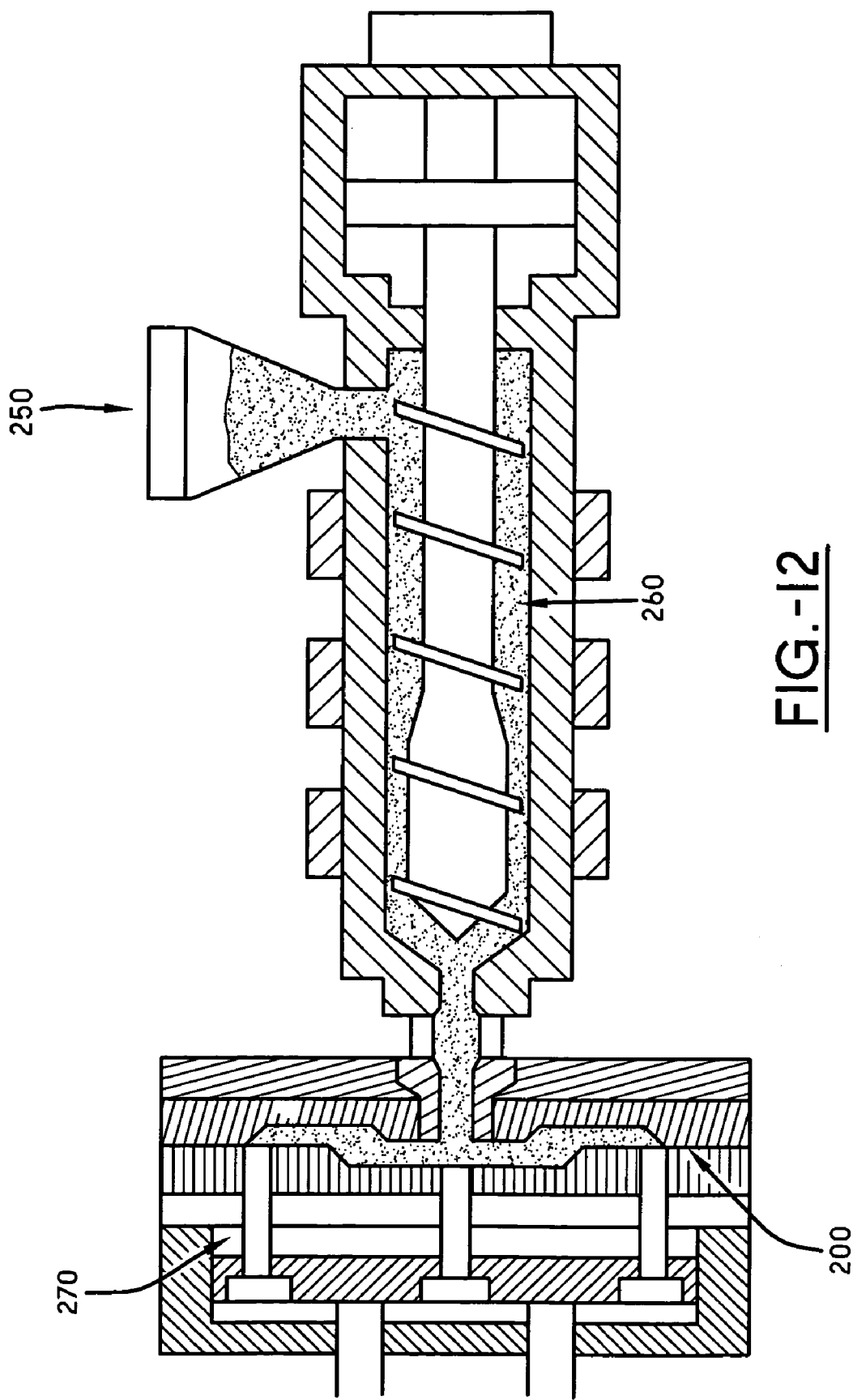
FIG. 12 is a perspective view of an injection molding apparatus.

With reference now to FIGS. 11-12, it is noted that the process of injection molding is well known in the art and thus will only be described briefly here. In general, injection molding is a manufacturing technique for making objects from a thermoplastic material 260. The injection molding process may require the use of a production tooling, commonly referred to as a mold 200, and an injection-molding machine, also known as a press 210. The mold 200 commonly comprises at least a first section 202 and a second section 204. The mold 200 may be constructed in the inverse of the particular shape desired. A press 210 may hold the mold 200 closed while a thermoplastic material 260 such as acrylonitrile butadiene styrene (ABS), polypropylene, polyethylene, or polycarbonate is injected into the mold 200. The thermoplastic material 260 may be formed by melting a resin 250. Commonly, the resin 250 may be in pellet or granule form and melted by heat and shearing forces shortly before injection into the mold 200. After injection, the mold 200 may be cooled and the part extracted. Extraction may be by the use of extractor pins 270, air or any method chosen with sound engineering judgment. Injection-molded thermoplastic provides a relatively lightweight object with superior strength and durability in nearly any weather condition. Construction of the mirror assemblies 30, 40 is not limited to the method described herein, and may be constructed using any method chosen with sound engineering judgment.

With reference now to FIGS. 5-7, various methods for forming a mirror assemblies 30, 40 according to various embodiments of this invention will now be described. First, the middle portion 70 may be placed into a mold 100. The front portion 50 may then be formed by inserting a first thermoplastic material 102 into the mold 100 on a first side 52 of the middle portion 70. The front portion 50 may be substantially transparent or clear. The first thermoplastic material 102 may be a polycarbonate. In another embodiment, the first thermoplastic material 102 may be any thermoplastic chosen within sound engineering judgment. In a more specific embodiment, the first thermoplastic material 102 may be inserted into the mold using an injection molding process. In one embodiment, the front portion 50 adheres to at least a portion of the first side 52 of the middle portion 70. When used with an exterior mirror assembly 30, a scratch resistant material 54 may be applied to at least a portion of the front portion 50 for use in protecting the front portion 50 from ice, snow, dirt, and other material that may contact an exterior mirror 30. In one embodiment, the scratch resistant material 54 is a coating that is applied by having the coating flow over at least a portion of the front portion 50. In another embodiment, the scratch resistant material 54 is any material chosen within sound engineering judgment and applied to at least a portion of the front portion 50. The back portion 90 may then be formed by inserting a second thermoplastic material 104 into the mold 100 on a second side 92 of the middle portion 70. The front and back portions 50, 90 are thus both in an over-molded structural relationship with respect to the middle portion 70 when the respective first and second thermoplastic materials set. Further, in the exemplary embodiment, the back portion 90 is in an over-molded structural relationship with respect to the first portion 50. The back portion 90 may be opaque having any desired color or colors as is known in the art. The second thermoplastic material 104 may be a polycarbonate. In another embodiment, the second thermoplastic material 104 may be any thermoplastic chosen within sound engineering judgment. In a more specific embodiment, the second thermoplastic material 104 may be inserted into the mold 100 using an injection molding process. In one embodiment, the back portion 90 adheres to at least a portion of the second side 92 of the middle portion 70. In yet another embodiment, the back portion 90 may adhere to at least a portion the front portion 50. In still another embodiment, the back portion 90 may adhere to at least of portion of the front portion 50 and at least a portion of the second side 92 of the middle portion 70. In still another embodiment, the front portion 50, the back portion 90 or a combination of the back and front portions 90, 50 may encompass the perimeter 94 of the middle portion 70 and thereby partially or fully seal the mirror assemblies 30, 40. Encompassing the perimeter 94 of the middle portion 70 means substantially surrounding the outside edge of the middle portion 70 with either the front portion 50 the back portion 90 or both the front and back portions 50, 90. In one embodiment, the front portion 50 substantially surrounds the perimeter 94 of the middle portion 70. In another embodiment, the back portion 90 substantially surrounds the perimeter 94 of the middle portion 70. In yet another embodiment, both the front portion 50 and the back portion 90 each at least partially surround the perimeter 94 of the middle portion 70. Partially sealing the mirror assemblies 30, 40 means having the front portion 50 and the back portion 90 in contact with each other around at least a portion of the perimeter 94 of the middle portion 70. Fully sealing the mirror assemblies 30, 40 means having the front portion 50 and the back portion 90 in contact with each other around substantially the entire perimeter 94 of the middle portion 70. In one embodiment, the front portion 50 and the back portion 90 form a seam 96 on the outside surface 98 of the mirror assembly.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:
1. A mirror assembly comprising:
a middle portion having a first side, a second side, and a perimeter, wherein the first side comprises a reflective portion and the second side comprises a heater member, and wherein a protective member is located between the reflective portion and the heater member to protect the reflective portion from substantially direct contact with the heater member;
a front portion that is substantially transparent and a first thermoplastic material over-molded with respect to the first side of the middle portion;
a back portion that is substantially opaque and a second thermoplastic material over-molded with respect to the second side of the middle portion; and,
wherein at least one of the front portion and the back portion substantially surround and contact the perimeter of the middle portion and one of the front portion and back portion is over-molded with respect to the other of the first portion and back portion to at least partially seal the middle portion.

2. The mirror assembly of claim 1 further comprising:
a scratch resistant material covering at least a portion of the front portion.

3. The mirror assembly of claim 1, wherein:
the first thermoplastic material is a first polycarbonate material; and
the second thermoplastic material is a second polycarbonate material.

4. The mirror assembly of claim 1, wherein:
the back portion includes a first integrated attachment device for use in attaching the device to a vehicle, wherein the back portion and the first integrated attachment device are formed as one-piece.

5. The mirror assembly of claim 1 wherein only one of the front portion and the back portion surrounds and contacts the perimeter of the middle portion in an over-molded relationship.

6. The mirror assembly of claim 1 wherein the first portion is further defined as being over-molded with respect to a majority of a surface area of the first side of the middle portion.

7. The mirror assembly of claim 1 wherein the first portion is further defined as directly contacting the reflective portion.

8. The mirror assembly of claim 1 wherein both of the front portion and the back portion surrounds and contacts the perimeter of the middle portion in an over-molded relationship.

9. A vehicle comprising:
a vehicle frame;
an engine supported to the vehicle frame;
at least one ground engaging wheel supported to the frame and operatively connected to the engine to provide locomotion to the vehicle;
a vehicle body supported to the frame and defining a passenger compartment; and,
a mirror assembly supported to the vehicle, the mirror assembly comprising:
a middle portion having a first side, a second side, and a perimeter, wherein the first side comprises a reflective portion and the second side comprises a heater member, and wherein a protective member is located between the reflective portion and the heater member to protect the reflective portion from substantially direct contact with the heater member;

a front portion that is substantially transparent and a first thermoplastic material over-molded with respect to the first side of the middle portion;
a back portion that is substantially opaque and a second thermoplastic material over-molded with respect to the second side of the middle portion; and,
wherein at least one of the front portion and the back portion substantially surround and contact the perimeter of the middle portion and one of the front portion and back portion is over-molded with respect to the other of the first portion and back portion as well as the middle portion to at least partially seal the middle portion.

10. The vehicle of claim 9 further comprising:
a scratch resistant material covering at least a portion of the front portion.

11. The vehicle of claim 9, wherein:
the first thermoplastic material is a first polycarbonate material; and
the second thermoplastic material is a second polycarbonate material.

12. The vehicle of claim 9, wherein:
the back portion includes a first integrated attachment device for use in attaching the mirror assembly to the vehicle, wherein the back portion and the first integrated attachment device are formed as one-piece.

13. The vehicle of claim 12, wherein:
the back portion includes a second integrated attachment device for use in attaching the mirror assembly to the vehicle.

14. The vehicle of claim 12, wherein:
the first integrated attachment device attaches the mirror assembly to the exterior of the vehicle.

15. The vehicle of claim 12, wherein:
the first integrated attachment device attaches the mirror assembly to the interior of the vehicle.

16. A method of forming a mirror assembly comprising the steps of:
(a) inserting a middle portion into a first mold, wherein the middle portion comprises a first side, having a reflective portion, a second side, and a perimeter;
(b) inserting a first thermoplastic material into the first mold to overmold a front portion on the reflective portion on the first side of the middle portion, wherein the front portion is substantially transparent when the first thermoplastic material sets;
(c) inserting a second thermoplastic material into the first mold on the second side of the middle portion to form a back portion, wherein the back portion is substantially opaque when the second thermoplastic material sets, wherein the front portion substantially surrounds the outside edge of the middle portion and at least partially seals the middle portion.

17. The method of claim 16 further comprising the steps of:
applying a scratch resistant material to the front portion.

18. The method of claim 16 wherein:
prior to step (a), the method comprises the step of: attaching a heater member to the second side of the middle portion.

19. The method of claim 18, wherein:
prior to step (a), the method further comprises the step of: positioning a protective member between the reflective portion and the heater member to protect the reflective member from substantially direct contact with the heater member.

20. The method of claim 16 wherein:
step (b) comprises the step of: injecting a first polycarbonate material into the mold; and,
step (c) comprises the step of: injecting a second polycarbonate material into the mold.

* * * * *